United States Patent [19]

Bitzmann

[11] Patent Number: 5,228,078
[45] Date of Patent: Jul. 13, 1993

[54] TWO-WIRE INTERCOM WITH HANDS-FREE FUNCTION

[75] Inventor: Jurgen Bitzmann, Untermeitingen, Fed. Rep. of Germany

[73] Assignee: Telko GmbH, Untermeitingen, Fed. Rep. of Germany

[21] Appl. No.: 858,587

[22] Filed: Mar. 27, 1992

[30] Foreign Application Priority Data

Mar. 27, 1991 [DE] Fed. Rep. of Germany ....... 9103782

[51] Int. Cl.$^5$ .................. H04M 9/04; H04M 9/08; H04M 11/00
[52] U.S. Cl. .................. 379/168; 379/172; 379/169
[58] Field of Search ............ 379/172, 168, 169, 171, 379/103, 104

[56] References Cited

U.S. PATENT DOCUMENTS

| | | |
|---|---|---|
| 3,743,791 | 7/1973 | Duff et al. ............... 379/171 |
| 3,761,630 | 9/1973 | Silitch ..................... 379/171 |

FOREIGN PATENT DOCUMENTS

| | | |
|---|---|---|
| 2156517 | 9/1972 | Fed. Rep. of Germany . |
| 2403096 | 7/1975 | Fed. Rep. of Germany . |
| 2547188 | 12/1977 | Fed. Rep. of Germany . |
| 3432054C2 | 8/1988 | Fed. Rep. of Germany . |
| 3804552 | 3/1989 | Fed. Rep. of Germany . |

*Primary Examiner*—Stafford Schreyer
*Attorney, Agent, or Firm*—Oliff & Berridge

[57] ABSTRACT

An intercom system for a door and inside stations has a speech function for two-way communication with hands-free operation. The intercom system includes a two-wire connecting lead between the door station and each inside station to transmit a conversation current and an operating current. The intercom system includes a bridge circuit for suppressing feedback, a bipole circuit to decouple conversation currents from a power supply, a calling circuit for calling on the two-wire connecting lead and using a call current of opposite plurality with respect to the operating current, and a short-circuit circuit in each inside station for short-circuiting the corresponding two-wire connecting lead when the corresponding door opening button is actuated.

13 Claims, 3 Drawing Sheets

TWO-WIRE INTERCOM WITH HANDS-FREE FUNCTION

BACKGROUND

1. Field of the Invention

The invention relates to a door intercom and in particular a door intercom having a door station and at least one inside station connected therewith, and having a speech function with the functions "calling inside station from door station", "talking between door station and inside station", and "opening door from inside station".

The invention relates to a door intercom designed as a hands-free system. In other words the user speaks directly into the instrument not only at the door station but also at every inside station, without using a handset.

2. Description of the Related Art

Known door intercoms with these functions, which operate as hands-free systems, are designed either as one-way intercom systems or as two-way intercom systems. In one-way intercom systems, the speaking direction is changed by manually switching the speaking direction at the inside station. One-way intercom systems of this kind are also known as two-wire systems, in other words a two-wire connection is sufficient between the door station and the inside station. In known two-way systems, a connecting line consisting of at least three conductors is necessary for the connection between the door station and the inside station.

In retrofitting buildings with door intercoms which previously had only simple bell systems, it is desirable of course to install the system by reusing the existing two-wire bell lines, since expanding the bell wire installation by an additional wire would entail an unacceptable expense (at least) if the bell wires were not laid in a pipe but without a pipe and in the plaster, as is usually the case in old buildings.

For this reason, only two-wire door intercoms and not door intercoms that operate with more-than-two-wire connections can be added easily to old buildings with conventional bell systems.

Although two-wire two-way intercoms are already prior art as door intercoms, they are not made as hands-free installations; instead they have inside stations with handsets, i.e., telephones. These known systems are described in German Patent 21 56 517 and 25 47 88.

In these known door intercoms designed as telephone systems, good speech transmission at the inside station is guaranteed since the incoming sound is supplied directly to the user's ear by means of the handset and its loudspeaker, and the outgoing sound is received directly at the user's mouth by means of the microphone on the handset, but there are the disadvantages, frequently viewed as significant, that:

- the conversation with the visitor cannot be conducted in a hands-free manner, because one hand has to hold the handset and the other hand must be used to operate the door-opening button or the like;
- the inside station with the handset and its flexible connection, which must necessarily be of a certain length, is relatively bulky and is exposed to considerable risk of damage, firstly because these devices are often not treated carefully by subscribers, and secondly because the unit which projects for a distance from the wall is exposed to the risk of impact from persons going by.

However, a two-way system of this kind that uses a handset cannot simply be produced by mounting a fixed loudspeaker and a fixed microphone as a hands-free unit in a housing. Because of the greater distance between the ear and the mouth and the respective sound converting devices, particular transmission problems arise, higher amplifications of the speech currents are required, and, in contrast to the handset, there is a much greater acoustic coupling between the sound converters, in other words between the loudspeaker and the microphone. This means however that the additional feedback produced by two-wire operation between the transmitting and receiving directions must be kept very low in order to achieve the required protection against feedback howling with sufficiently high amplification in both directions, so that during normal speech the sound pressure is still sufficiently high at the other end of the transmission path.

In addition, the inside station, which has no power line connection of its own, must be supplied through the two-wire connecting line to the door station with sufficient DC power to operate the required amplifier, especially the loudspeaker amplifier, and sufficient conversation currents must be carried for reliable transmission. In addition, the terminal resistance of the inside stations, which differs according to the length of the line and the cross section of the line, makes clear balancing difficult both in the door station and in the inside stations. As a result, the total amplification in the two transmission directions, which is otherwise possible with a given protection against howling is reduced in both transmission directions with the result that the loudness at one or both locations is too low.

Because of the above problems, there are presently no two-wire door intercoms designed as hands-free units for two-way operation.

SUMMARY OF THE INVENTION

The goal of the invention is to provide a door intercom as a hands-free installation that operates in the two-way mode in order to be able to install it without additional installation effort in conjunction with two-wire bell systems, with one wire possibly being common to all inside stations, with the performance having to correspond at least to that of a conventional installation with a plurality of wires.

This goal is achieved according to the invention by the door intercom characterized by a door station and at least one inside station connected therewith; the intercom having a speech function with functions "call inside station from door station", "talk between inside station and door station" and "open door from inside station"; the speech function being a two-way communication with hands-free operation for both the door station and the inside station; the door station having at least one call button corresponding to the respective inside station, a loudspeaker circuit with a loudspeaker and loudspeaker amplifier, a microphone circuit with a microphone and a microphone amplifier, an electric door opener and a power supply circuit; and each inside station having an on/off switch, a door opening button, a loudspeaker and a microphone.

The intercom further includes a two-wire connecting lead between the door station and each inside station, the two-wire connecting lead serving to transmit a first conversation current from the door station to a respective inside station, a second conversation current from the respective inside station to the door station and also serving to supply an operating current from the door station to the respective inside station.

The intercom further includes for each inside station, a loudspeaker circuit for the loudspeaker and a microphone circuit for the microphone; a bridge circuit for suppressing feedback between the loudspeaker and the microphone of each inside station and a bridge circuit for suppressing feedback between the loudspeaker and microphone of the door station; for each inside station, a DC supply, decoupled from the conversation currents by a bipole circuit in each inside station and a bipole circuit to decouple the conversation currents from the power supply circuit in the door station; a calling circuit for calling over the two-wire connecting lead any one of the at least one inside station from the door station using a call current of opposite polarity with respect to the operating current; an interrupting circuit in the door station for interrupting the DC supply of each inside station when the corresponding call button is actuated; and a short-circuit circuit in each inside station for short-circuiting the corresponding two-wire connecting lead when the corresponding door opening button is actuated so that a door opener circuit in the door station, responding to a resulting drop in voltage on the two-wire connecting lead, activates the electric door opener.

Advantageous embodiments of the invention are the subject of the subclaims.

The door intercom according to the invention has the advantage that the inside stations, in contrast to conventional units that operate with handsets, can be designed as a compact flat unit without freely movable parts. Hence its space requirements are much smaller, these units are better protected against damage, and they offer a maximum of convenience and user friendliness. Simply switching them on and off by means of a button suffices to start and end the conversation. The speech-readiness of the system can also be displayed optically. A time circuit to shut off the speech operation automatically advantageously shuts off the line of the called subscriber after a certain period of time, if he or she has forgotten to operate the switch to shut it off at the end of the conversation. The subscriber can carry on a conversation with both hands free.

In order to prevent the speech currents coming from the microphone in the inside station and door station from being partially reflected at the line connection and coupled to the loudspeaker, whereby the unavoidable acoustic coupling between the loudspeaker and the microphone would result in feedback howling, suitable bridge circuits are inserted into the line for coupling the microphone and loudspeaker branches.

Apart from the amplifiers for the microphones of the inside station and the door station as well as the loudspeaker at the door station, an amplifier is also required for the loudspeaker of the inside station. This amplifier is not located in the door station but directly in the inside station, in order to ensure sufficient loudness there. In addition, the loudspeaker itself, in other words without a series-connected amplifier, because of its nonlinear apparent resistance curve over the frequency would make a sufficiently accurate simulation in the bridge circuit of the door station practically impossible.

By using DC circuits that have a high impedance to speech currents, the problem of sufficient DC supply voltage for the inside station over the connecting line from the door station which consists of only two wires is solved so that the loudspeaker amplifier of the inside station can deliver the necessary output power. At the door station, the DC required to supply the inside station is coupled into the connecting line and coupled out again at the inside station.

In order to suppress the insertion point of the feedback howling of the system, in other words to permit a higher total amplification, the amplitude elevations caused by the loudspeaker housing resonances, etc. are damped in the transmission range by band filters in the door station. For additional stability of the amplifiers, the operating voltages in the door station as well as the inside stations are stabilized.

With the system in the resting state, in other words when no inside station is switched on, the input amplifier in the door station is blocked. This prevents feedback howling occurring through the consequent mismatch of the bridge circuit of the door station.

In order for the total apparent resistance of a connected inside station, which differs depending on the length and cross section of the connecting leads, not to impair significantly the reverse attenuation of the bridge circuits, the internal resistances of the door and inside stations are made sufficiently high. In addition, a regulating circuit always keeps the lengthwise resistance of the leads at a given constant value.

BRIEF DESCRIPTION OF THE DRAWINGS

One embodiment of the invention will now be described in detail with reference to the attached drawings.

DETAILED DESCRIPTION OF THE PREFERRED EMBODIMENTS

Figure 1:
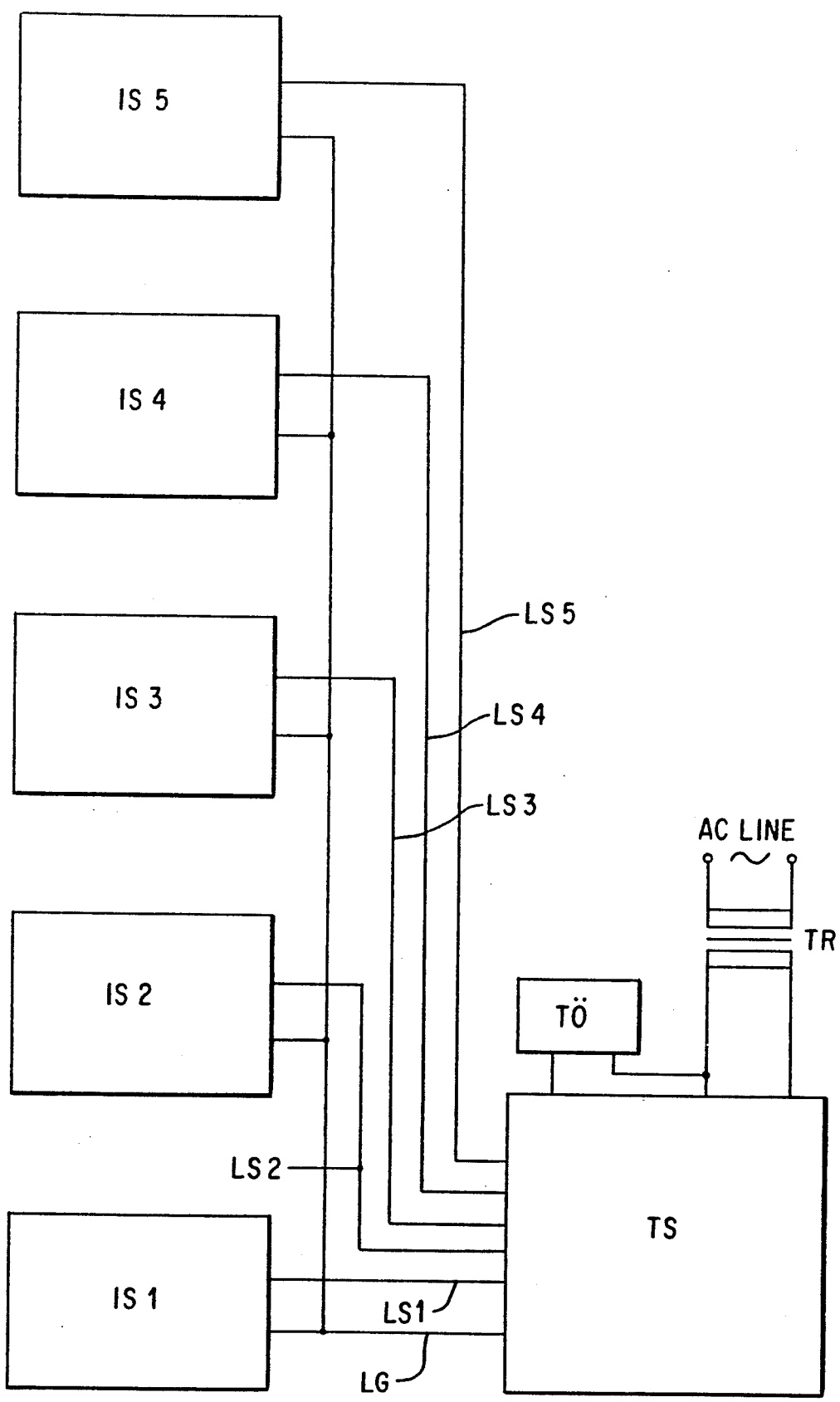
FIG. 1 is a block diagram of a door intercom according to the invention with a door station and a plurality of inside stations.

FIG. 1 is a schematic diagram of a door intercom with a door station TS and a plurality of inside stations IS1...IS5, which are connected by two-wire connecting leads with a signal carrying leads LS1...LS5 and a second lead LG, common to all the inside stations, with the door station. Door station TS is connected through a line transformer TR to the AC line and also powers a door opener TÖ.

Figure 2:
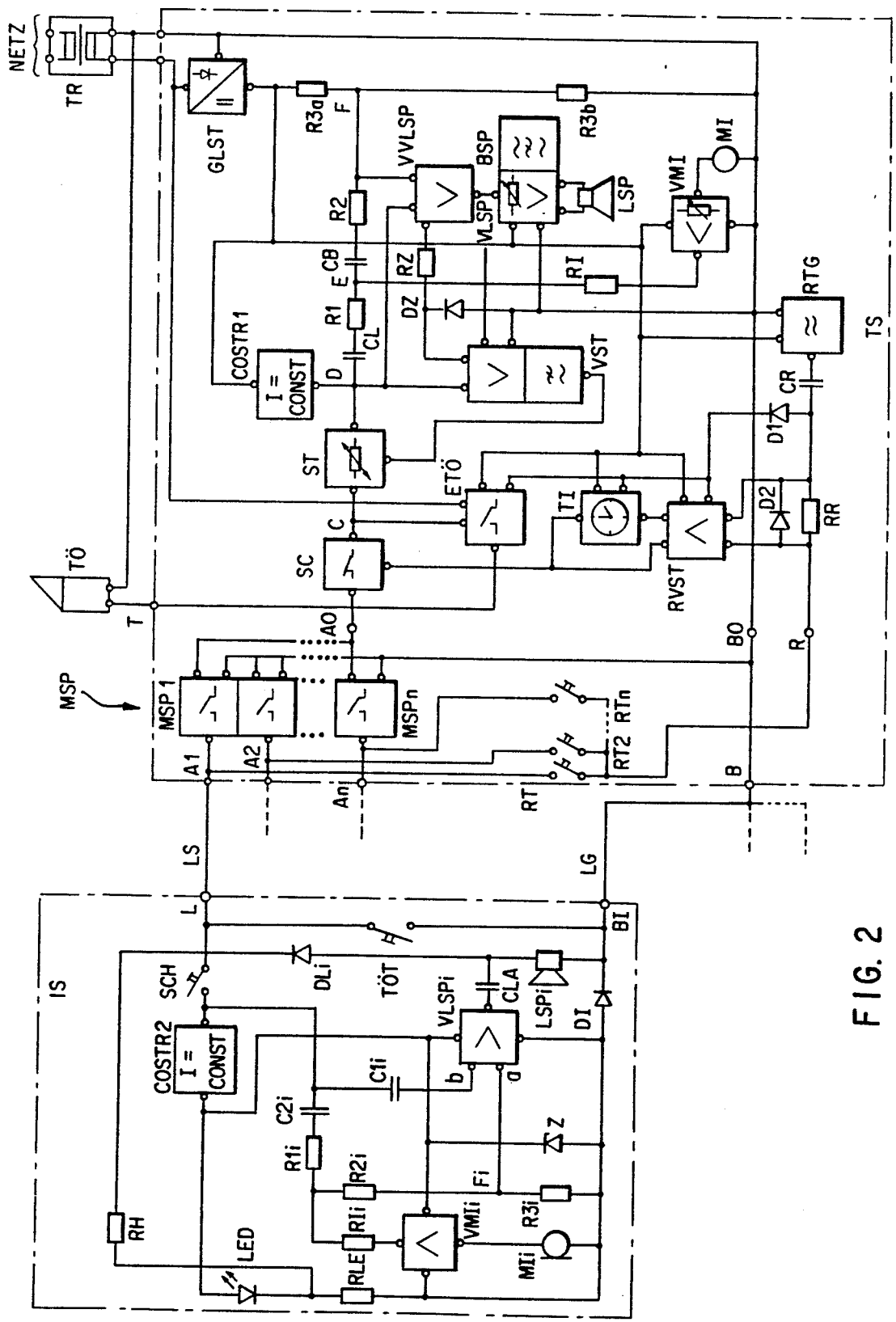
FIG. 2 is a schematic diagram of the door station and a connected inside station in greater detail.

FIG. 2 is a block diagram of door station T2 and an inside station IS connected thereto.

Door station TS has the following components:
 a rectifier and voltage stabilizer circuit GLST connected downstream from line transformer TR, the circuit generating a stabilized operating DC from the AC line voltage;
 a loudspeaker preamplifier VVLSP and an adjustable loudspeaker amplifier VLSP with integrated band filters BSP;
 a loudspeaker LSP;
 a microphone MI;
 an adjustable microphone amplifier VMI with an output resistor RI;
 a bridge circuit comprising resistors R1, R2, R3a, R3b, and capacitors CL and CB;

a DC circuit COSTR1;

a control amplifier VST with adjusting element ST and reference voltage source comprising a resistor RZ and a zener diode DZ;

a door opener circuit ETo;

a call tone generator RTG with a diode-capacitor combination D1,CR at the output;

a call-controlled speech path door opener shutoff comprising a switching element SC, a control amplifier RVST, a timer TI, and a diode D2 with a resistor RR in the calling path;

eavesdropping blocks MSP1, MSP2....MSPn in the line, collectively referred to as eavesdropping blocks MSP; and call buttons RT1, RT2....RTn, collectively referred to as call buttons RT.

The inside station (subscriber station) has the following components:

a bridge circuit comprising resistors R1$i$, R2$i$, R3$i$, and a capacitor C2$i$;

a DC circuit COSTR2;

a microphone M1$i$;

a microphone amplifier VMI$i$ with an output resistor RI$i$;

a loudspeaker amplifier VLSP$i$ with a coupling capacitor CLA;

a loudspeaker LSP$i$ with a call coupling diode DL;

a holding current resistor RH;

an operation indicator with a light-emitting diode LED and a series resistor RLE;

a zener diode Z to stabilize the operating voltage;

an ON and OFF switch SCH; and an isolating diode DI.

At door station TS, the terminals for signal wires LS1 ... are marked A1 ... An and the joint terminal for leads LG is marked B.

The system operates as follows:

When call button RT of the desired subscriber is actuated, the audio-frequency calling current which comes from calling tone generator RTG and is reverse-polarized by diode D1 and capacitor CR relative to the DC on the line, flows through the parallel circuit comprising diode D2 and resistor RR, depressed call button RT, through subscriber lead LS to the inside station, whose call coupling diode DL$i$ to loudspeaker LSP$i$ and via common lead LG back to the base point of the call tone generator. The loudspeaker of the inside station then sounds the call signal.

At the same time, a voltage drop in the parallel circuit comprising diode D2 and resistor RR is evaluated by control amplifier RVST. Control amplifier RVST switches on the timer TI and controls switching element SC, which is normally closed in the resting state, causing it to "open", in other words the speech part of the door station and the door opener circuit ETÖ are separated from the line during the call. The corresponding eavesdropping block MSP, to which the calling voltage, from a call button RT, is applied, is switched on. A thyristor is used as the switching element in the eavesdropping block. Its holding current circuit is closed by signal lead LS and resistors RH and RLE as well as diode DI of the inside station, as long as the latter is not switched on by switch SCH.

The loudspeaker preamplifier VVLSP in the door station is a differential amplifier, with one of its inputs being connected to the voltage divider and bridge resistors R3$a$/R3$b$ and the other of its inputs being connected to base point D of DC circuit COSTR1, in other words to the lead-side terminal of the bridge circuit.

As long as the inside station is not switched on, only a very low current, namely the holding current of the thyristor, flows through the DC circuit. As a result, the voltage at base point D is much higher than at the node point of the voltage divider R3$a$/R3$b$, and preamplifier VVLSP is driven by the high DC differential between its inputs to saturation, i.e., it is blocked.

When the inside station is switched on by switch SCH, a circuit is closed that runs from the operating voltage source GLST through DC circuit COSTR1, base point D, adjusting element ST designed as a controllable resistor, switching element SC, the thyristor of the eavesdropping block MSP which is switched on, signal lead LS from terminal A (in this case from terminal A1 via signal lead LS1) to terminal L of the inside station, through switch SCH, DC circuit COSTR2, zener diode Z, isolating diode DI, to terminal BI of the inside station over common lead LG to terminal B of the door station and thence to its ground BO, the opposite pole of the operating voltage.

Parallel to the voltage stabilizing diode Z are the current consumers of the inside station, namely the two amplifiers VMI$i$ and VLSP$i$ as well as the light-emitting diode LED which is connected through resistor RLE. The current through resistor RH when switch SCH is closed is much smaller than before, since the voltage at input L is lower and the voltage is higher at the cathode of the LED. As a result, the lead is not loaded unnecessarily. The LED indicates that the speech connection has been made. The operating current for the inside station that has been switched on, flowing through the DC circuit COSTR1 in the door station, causes the voltage at its base point D to drop several volts. Consequently the DC differential between the inputs of preamplifier VVLST falls to the point where the latter operates normally.

The apparent resistances of capacitors C1$i$ and C2$i$ of the inside station and capacitors CL and CB of the door station can be disregarded for the frequency range in which we are interested in the following discussion. The output resistances of amplifiers VMI and VMI$i$ are included in resistors RI and RI$i$, respectively.

When someone speaks at the inside station, the sound waves that are converted into conversation voltages by microphone MI$i$ are amplified in amplifier VMI$i$ and delivered through resistors RI$i$ and R1$i$, capacitor C2$i$ and switch SCH to the signal leads at terminal L. The ground relative to the signal is connected by isolating diode DI with common lead LG.

Loudspeaker amplifier VLSP$i$ is designed as a differential amplifier. One of its inputs a is connected to the terminal F$i$ of bridge resistors R2$i$ and R3$i$ and its other input b is connected by capacitor C1$i$ with a terminal of C2$i$ and COSTR2 and from there through switch SCH with terminal L. Between terminal L and the ground of the inside station there is an apparent resistance which is formed by the series connection comprising the connecting line resistance, eavesdropping block MSP, the apparent resistance of the door station, and isolating diode DI. Since resistor R2$i$ behaves with respect to resistor R3$i$ in the same way as resistor R1$i$ behaves toward the apparent resistance between terminal L and the ground of the inside station, with respect to both quantity and phase (R1$i$, R2$i$, and R3$i$ are appropriately dimensioned), the voltages at the two differential inputs of amplifier VLSPi are the same size and therefore no signal is applied to loudspeaker LSPi.

The speech currents from the inside station flow to the door station via signal leads LS, the conducting eavesdropping block MSP, switch SC, and adjusting element ST to the base point and bridge point D, where one input of preamplifier VVLSP is connected. The other input of preamplifier VVLSP receives the signal through voltage dividers R1/RI and R2/R3, wired in cascade, in other words with reduced voltage. The signal voltage differential between the two preamplifier inputs is amplified and fed to the input of amplifier VLSP, which amplifies the differential signal again and feeds it to the connected loudspeaker LSP. The band traps are integrated into amplifier VLSP, but of course can also be wired in series with the amplifier, but this would mean additional expense. They reduce the amplification in critical frequency ranges in which feedback howling could occur.

The conversation voltages delivered by microphone MI of the door station are amplified in connected amplifier VMI and then pass through resistor RI to bridge point E and thence on through bridge resistor RI, capacitor CL, base point D, adjusting element ST, switch element SC and connected eavesdropping block MSP, to signal lead LS. The speech signal applied to base point D, to which one input of preamplifier VVLSP is also connected, is equal in value and phase to the signal applied to the other input of this preamplifier at bridge point F, in other words at the node point of resistors R2 and R3a/R3b. This signal equivalence is achieved by corresponding dimensioning of the bridge resistors, so that the resistance ratio between R1 and the sum of the resistances of adjusting element ST, switching element SC, eavesdropping block MSP, the connecting lead, and the switched-on inside station equivalent resistance, corresponds in terms of value and phase to the resistance ratio between resistor R2 and parallel resistors R3a and R3b. In this way, however, the signal for the preamplifier is zero and loudspeaker LSP, which is coupled thereto via in-line amplifier VLSP, likewise receives no signal.

The speech signal from the door station arriving via the signal leads at the inside station flows via switch SCH and capacitor C1i to input b of amplifier VLSPi and through the voltage divider resistors R1i/RIi and R2i/R3i connected in cascade, to input a of this amplifier. Capacitor C2i is used to decouple the DC. The signal voltage differential at the two inputs of amplifier VLSPi is amplified and passes through capacitor CLA to loudspeaker LSPi. Isolating diode DI which is permeable to the DC connects the other pole of the loudspeaker with the base point of the amplifier.

To open the entrance door, in other words to actuate door opener TÖ from the inside station, button TÖT on the inside station is operated, with its terminals L and BI being shorted. As a result, point C which is connected with the input of door opener circuit ETÖ, reaches a potential which is higher than the ground potential only by the amount of small voltage drops of the connecting lead, eavesdropping block MSP, and switch SC. This criterion is evaluated by door opener circuit ETÖ; door opener TÖ is connected by a switch of the door opener circuit to the supply AC and actuated to release the door.

Figure 3:
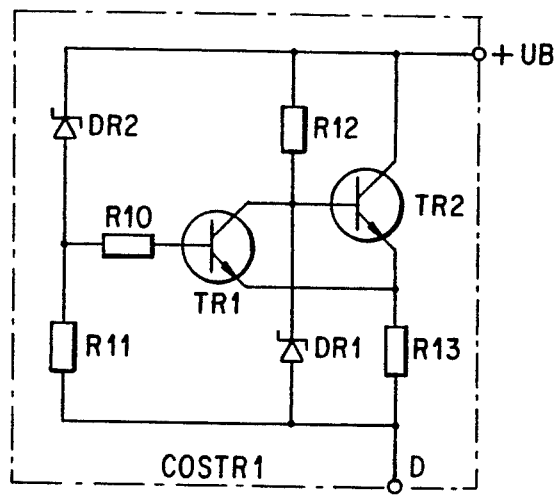
FIG. 3 is a schematic diagram of the DC power source of the door station, with safety circuit.

In order that no thermal overloading of DC circuit COSTR1 of the door station can occur in the event of a short circuit in the connecting wiring or during continuous operation of the door opening button at the inside station, it is equipped with a protective circuit as shown in FIG. 3. The DC circuit itself comprises transistor TR2, zener diode DRI, and resistors R12 and R13. If the collector-emitter voltage of a transistor TR1 rises above the sum of the reference voltage at a zener diode DR2 and the threshold voltage of the base-emitter lead of transistor TR1, transistor TR1 conducts, and blocks transistor TR2 by short-circuiting its base-emitter lead. Only a residual current then flows which is determined primarily by the freely selectable resistor R11 and resistors R12 and R13.

After the short circuit is corrected or the door opening button is released, the voltage at point D again rises to the point where transistor TR1 is blocked once again and the DC circuit then continues to operate normally.

To regulate the different resistances of the connecting lines between the door station and the individual inside stations, adjusting element ST is used. It supplements the resistance of the inside station that has been connected to a constant value which is involved in the bridge balancing. For this purpose, the voltage at the connected inside station is adjusted between line terminals L and BI in simple fashion to a value which is the same for all the inside stations, using as zener diode Z a zener diode with an adjustable voltage.

The differential amplifier VST of the door station then taps off the DC at base point D and compares it with the reference voltage at zener diode DZ, which is likewise adjustable.

The connected adjusting element ST is controlled by the resultant, amplified differential voltage until the voltage at base point D corresponds to the specified value. Since the current fed by DC circuit COSTR1 into the line is constant, there is thus obtained for the bridge circuit, a resistor of a constant value from the sum of the actual line resistance, the resistance of adjusting element ST, and the constant resistance value from eavesdropping block MSP and switching element SC. This total value is the quotient of the difference of the voltage between the base point D and ground, and the voltage across terminals L and BI of the inside station and the supply current on the line.

A field-effect transistor is suitable as an adjusting element ST, i.e., as an adjustable resistor, as may be seen from the pertinent literature. A built-in feedback for the speech frequency-AC voltages in amplifier VST and a lowpass at its output prevent the speech currents from affecting the regulation.

Since switch SCH of the inside station must remain constantly closed during the conversation, a normal pushbutton is not suitable for this purpose since the latter would otherwise have to be held down throughout the entire conversation, which is impractical and uncomfortable. Switch SCH is therefore a pushbutton or the like which locks when pressed, so that it is closed when actuated and remains closed. Of course there is the danger that, after the conversation is over, one may forget to disconnect the inside station again by pressing switch SCH once more. The speech connection between the inside station and the door station is then maintained and one can overhear from the street what is going on in the dwelling in question. Therefore, timer TI, which is turned on during the call through amplifier RVST, after a preset interval, switches switching element SC briefly to "open" thus shutting off this inside station, while the holding circuit of the respective eavesdropping block MSP is interrupted and opens the latter.

Figure 4:
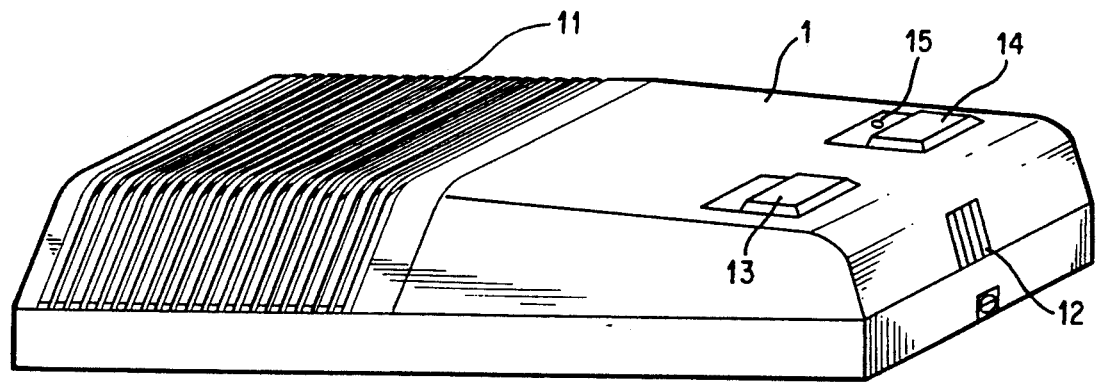
FIG. 4 is a perspective view of the housing of an inside station in a perspective view.
Figure 5:
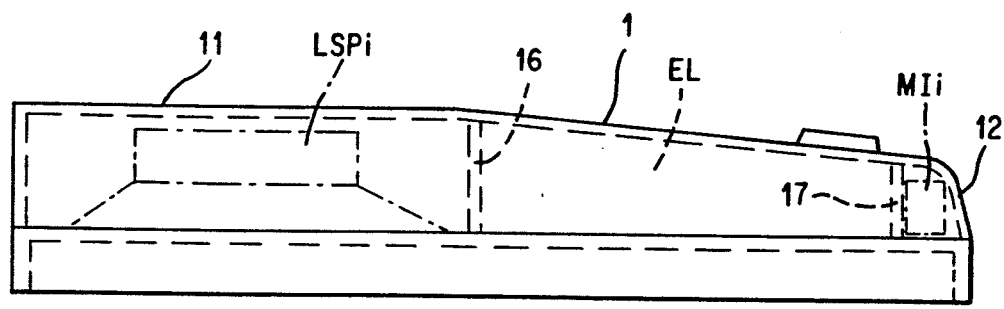
FIG. 5 is a schematic diagram of the mechanical interior structure of an inside station.

FIGS. 4 and 5 show one embodiment of the inside station in the form of a flat device to be mounted on the wall. Housing cover 1, as shown in FIG. 4, in the loudspeaker area has a sound outlet opening 11 and in the area of the lower edge has a sound entrance opening 12, with which the microphone is associated. As operating elements, there are provided on the housing a button 13, which is associated with door opener button TÖT in the circuit shown in FIG. 2, and a button 14 associated with switch SCH in the circuit diagram shown in FIG. 2, while in the area of button 14 there is located as a display element 15 the light-emitting diode marked LED in the circuit diagram in FIG. 2. The arrangement of the essentially downwardly directed sound opening 12 for the microphone and the essentially horizontally directed sound opening 11 for the loudspeaker (FIG. 4 shows the device lying down; the operating position however is one in which the device is mounted vertically on the wall) ensures the best possible acoustic decoupling between the loudspeaker and the microphone.

FIG. 5 shows a highly schematic side view of the inside station device according to FIG. 4, in order to show more clearly the features of the internal design which are of significance in conjunction with acoustic decoupling. The interior of the housing is divided by two partitions 16 and 17 into three chambers, of which the uppermost chamber is occupied by the loudspeaker and the lowermost chamber is occupied by the microphone, and the middle chamber located between them serves to accommodate the electronics EL of the inside station which are not shown in greater detail. Microphone MIi is then essentially oriented downward toward sound inlet opening 12. Loudspeaker LSPi in the uppermost chamber is preferably installed with the special feature that it is oriented with its diaphragm facing the bottom of the housing and its back facing sound outlet opening 11. The loudspeaker is installed in such a way that its diaphragm delimits an enclosed chamber together with the housing bottom and from the front side of the diaphragm delivers the sound pressure into this closed chamber. Partition 16 works together with the housing side walls to exert a favorable influence on the sound outlet direction, namely forward. No reflections occur at the bottom of the housing. This measure also results in a perceptible improvement in acoustic decoupling.

What is claimed is:

1. An intercom with a door station and at least one inside station connected therewith; the intercom having a speech function with functions "call inside station from door station", "talk between inside station and door station" and "open door from inside station"; the speech function being a two-way communication with hands-free operation for both the door station and the inside station; the door station having at least one call button corresponding to the respective inside station, a loudspeaker circuit with a loudspeaker and loudspeaker amplifier, a microphone circuit with a microphone and a microphone amplifier, an electric door opener and a power supply circuit; each inside station having an on/off switch, a door opening button, a loudspeaker and a microphone, the intercom comprising:

(a) a two-wire connecting lead between the door station and each inside station, the two-wire connecting lead serving to transmit a first conversation current from the door station to a respective inside station, a second conversation current from the respective inside station to the door station and also serving to supply an operating current from the door station to the respective inside station;

(b) for each inside station, a loudspeaker circuit for the loudspeaker and a microphone circuit for the microphone;

(c) for each inside station, bridge means for suppressing feedback between the corresponding loudspeaker and microphone; and for the door station, bridge means for suppressing feedback between the door station loudspeaker and microphone;

(d) for each inside station, a DC supply decoupled from the conversation currents by a respective bipole circuit; and for the door station a bipole circuit to decouple the conversation currents from the power supply circuit;

(e) calling means for calling over the two-wire connecting lead any one of the at least one inside station from the door station using a call current of opposite polarity with respect to the operating current;

(f) interrupting means in the door station for interrupting the DC supply of each inside station when the corresponding call button is actuated; and (g) short-circuit means in each inside station for short-circuiting the corresponding two-wire connecting lead when the corresponding door opening button is actuated so that a door opener circuit in the door station, responding to a resulting drop in voltage on the two-wire connecting lead, activates the electric door opener.

2. The intercom of claim 1, wherein the bipole circuit in each inside station is a constant-current circuit which couples the CC supply of the respective inside station to the two-wire connecting lead and the bipole circuit in the door station is a constant-current circuit which couples the door station to the two-wire connecting lead.

3. The intercom of claim 1, wherein the intercom further includes at least one eavesdropping block corresponding to the respective inside station and a switching element in a speech circuit with a self-retaining function which is in an open-circuit state when the intercom is in a resting state and is switchable into a closed-circuit stated by actuating the on/off switch on the respective inside station.

4. The intercom of claim 3, wherein the interrupting means includes an interrupt switching element and the door station includes a timer circuit for timing a preset interval switched on when any one of the at least one call button is actuated, the interrupt switching element being switched to the open-circuit state so as to interrupt the self-retaining function of the at least one eavesdropping block by interrupting the DC supply of the respective inside station when the preset interval has expired.

5. The intercom of claim 3, wherein all of the at least one eavesdropping block are located in the door station.

6. The intercom of claim 1, further including resonance suppression means in the door station for suppressing resonance peaks in the first and second conversation currents resulting from a housing resonance, including a loudspeaker housing resonance, the resonance suppression means including bandpass filters in a speech circuit.

7. The intercom of claim 2, wherein the DC circuit in the door station includes protective circuit means for blocking the DC circuit during a duration of a significant drop in a voltage on the two-wire connecting lead.

8. The intercom of claim 7, wherein the protective circuit means includes a voltage comparator circuit for comparing an output voltage from the constant-current circuit with a reference voltage so as to block the constant-current circuit when the output voltage is less than the reference voltage.

9. The intercom of claim 1, wherein a "sum" amplification of a microphone and loudspeaker branch in the door station and a "sum" amplification of a microphone and loudspeaker branch in any one of the at least one inside station are substantially the same.

10. The intercom of claim 1 further including a housing for each one of the at least one inside station, wherein the microphone of the respective each one of the at least one inside station is oriented substantially downwardly toward a sound inlet opening in a lower edge area of the housing, and wherein the loudspeaker of the respective each one of the at least one inside station is located in a separate housing chamber with a radiating direction which is substantially horizontal.

11. The intercom of claim 1 further including a housing for each one of the at least one inside station, wherein the loudspeaker of the respective each one of the at least one inside station is oriented so that a diaphragm of the loudspeaker faces a rear wall of the housing.

12. The intercom of claim 11, wherein the diaphragm cooperates with the rear wall to form a sealed chamber and wherein the housing includes a partition separating the loudspeaker from the rest of the housing.

13. The intercom of claim 1, further including a light-emitting diode in each one of the at least one inside station, the light-emitting diode lighting when a speech circuit is closed.

* * * * *